No. 717,496. Patented Dec. 30, 1902.
F. CONRAD.
METHOD OF MEASURING THE ENERGY OF THREE PHASE ALTERNATING CURRENT CIRCUITS.
(Application filed Jan. 6, 1902.)
(No Model.)
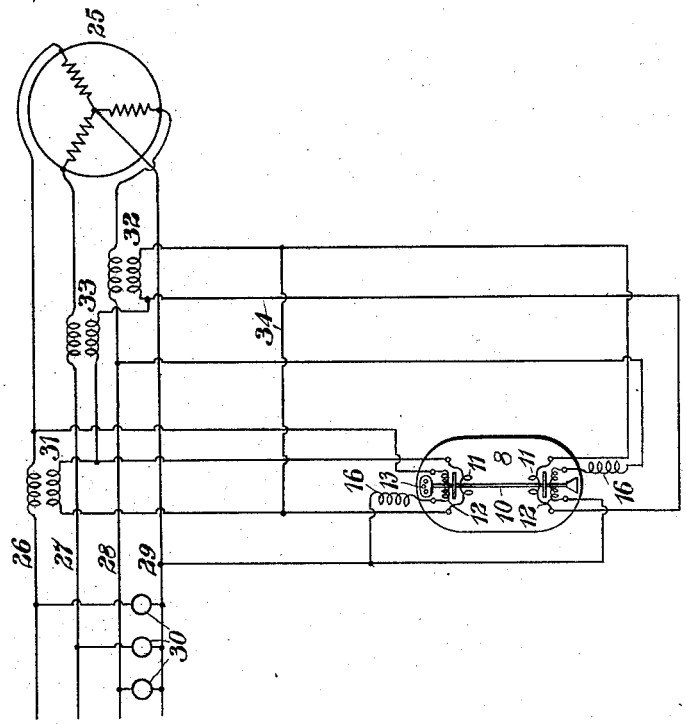
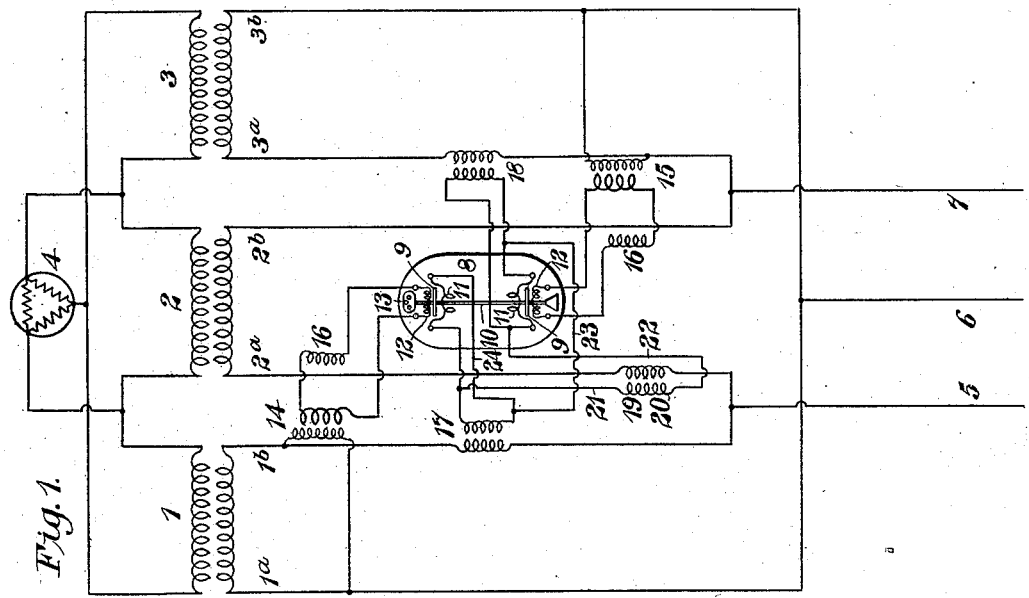
WITNESSES:
C. L. Belcher
Birney Hines
INVENTOR
Frank Conrad
BY
Wesley G. Carr
ATTORNEY.

UNITED STATES PATENT OFFICE.

FRANK CONRAD, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF MEASURING THE ENERGY OF THREE-PHASE ALTERNATING-CURRENT CIRCUITS.

SPECIFICATION forming part of Letters Patent No. 717,496, dated December 30, 1902.

Original application filed February 14, 1901, Serial No. 47,349. Divided and this application filed January 6, 1902. Serial No. 88,601. (No model.)

*To all whom it may concern:*

Be it known that I, FRANK CONRAD, a citizen of the United States, residing at Wilkinsburg, in the county of Allegheny and State of Pennsylvania, have invented a new and useful Improvement in Methods of Measuring the Energy of Three-Phase Alternating-Current Circuits, of which the following is a specification, this application being a division of an application filed by me February 14, 1901, Serial No. 47,349.

My invention relates to alternating-current systems of electrical distribution and particularly to methods of measuring the energy of such systems.

The object of my invention is to provide a method whereby the energy of three-phase circuits may be accurately measured by a two-phase wattmeter or by two single-phase wattmeters.

In power installations it is often found necessary to measure the output of three transformers which are connected in delta to a three-phase circuit or the energy of three circuits which are otherwise interconnected in such manner that the voltage of any one of them is equal to the resultant voltage of the other two. It is obvious that such energy may be measured by means of independent single-phase wattmeters respectively connected to the several circuits, the readings of the three meters being added together; but inasmuch as it is always desirable to simplify apparatus so far as may be practicable without impairing the efficiency it will obviously be advantageous to measure the energy of three interconnected circuits by means of a single instrument. I have therefore devised the method illustrated in the accompanying drawings, in which—

Figure 1 is a diagram of a portion of a three-phase system embodying three transformers the primaries of which are connected to the source of current in delta and the secondaries of which are connected in the same manner to a three-phase distributing-circuit and in which a two-phase wattmeter is so connected to the transformer secondaries as to accurately measure the output. Fig. 2 is a diagram of a three-phase four-wire circuit and a two-phase wattmeter so connected as to measure the entire energy of such circuit.

My invention consists of a method of combining the voltages and currents of three-phase circuits to attain the above-mentioned results; and it is immaterial to the invention what type or kind of wattmeter be employed and whether it be provided with means for indicating, registering, or recording the energy measured by it.

Referring particularly to Fig. 1 of the drawings, 1, 2, and 3 are transformers the primary windings of which are connected in delta to a three-phase generator 4. The secondary windings of the transformers 1, 2, and 3 are also connected in delta to a distributing or transmission circuit 5, 6, and 7. In order to measure the output of the transformers 1, 2, and 3, I may employ a wattmeter of any suitable construction. As an example of a suitable instrument, I have shown diagrammatically a wattmeter 8, like that illustrated in Fig. 5 of Patent No. 608,842, granted to H. P. Davis and myself, August 8, 1898, in which the armatures 9 of two instruments are mounted upon a vertical shaft or spindle 10. A series field-winding 11 and a shunt field-winding 12 are employed in conjunction with each armature, and suitable phase-adjusting means and friction-compensating means may also be employed, as set forth in the patent above referred to, if desired.

While convenience and compactness of arrangement may make it desirable to embody the above-mentioned mechanism in a single instrument, it would be feasible to employ two independent instruments, since the only interdependence which exists in the structure, as shown, resides in the mounting of the armatures upon a single shaft or spindle and the employment of a single registering device 13.

For the reason just stated the measuring apparatus shown may for convenience be regarded as comprising either one or two instruments, and I therefore desire it to be understood that references hereinafter made in the specification or the claims either to members of one instrument or to two instruments are not to be construed as excluding either of the arrangements mentioned.

In utilizing the instrument 8 in accordance with my present invention I connect the shunt-windings of the upper and lower members of the wattmeter respectively to the secondary windings of transformers 14 and 15, the primary windings of which are respectively connected across the circuits $1^a$ $1^b$ and $3^a$ $3^b$. Inductive resistance-coils 16 may be included in circuit between each of the shunt-windings 12 and the secondary of the corresponding transformer 14 or 15 for the purpose of retarding the phase of the currents in the shunt-windings in the usual manner. It will be understood that the shunt-coils 12 of the wattmeter may be connected directly to the conductors $1^a$, $1^b$, $3^a$, and $3^b$ in cases where the voltages of the circuits are suitable for the said coils. The series coils of the upper and lower members of the instrument 8 are respectively supplied with currents proportional to those of the circuits $1^a$ $1^b$ and $3^a$ $3^b$ by means of series transformers 17 and 18, the primaries of such transformers being respectively included in conductors $1^b$ and $3^a$. To the extent above described the connections are those used in connection with a polyphase wattmeter employed for measuring the output of a two-phase circuit, the upper member of the instrument measuring the output of the transformer 1 and the lower member measuring the output of the transformer 3.

In order to measure the output of transformer 2, I provide a series transformer 19, the primary of which is included in the conductor $2^a$, leading from the secondary of the transformer 2, and make connections as follows: The terminals of the secondary winding 20 of the transformer 19 are respectively connected by means of conductors 21 and 22 to one terminal of the series coil 11 of the upper member and to the corresponding terminal of the series coil 11 of the lower member of the instrument 8. The other terminals of the coils 11 are connected together by means of conductors 23 and 24. It will be seen, therefore, that the current from the secondary 20 of series transformer 19 passes through the two windings 11 in series, and consequently that the current in the series winding of the upper member of the instrument 8 will be the resultant of the currents delivered by transfromers 1 and 2, while the current in coil 11 of the lower member of the instrument will be the resultant of the currents delivered by the transformers 2 and 3.

As has already been pointed out, the electromotive force impressed upon the shunt-winding of the upper member will be that of the transformer 1, while the electromotive force impressed upon the shunt-winding of the lower member will be that of the transformer 3. Since the voltage of any one of three transformers connected in delta in a three-phase circuit is equal to the resultant of the voltages of the other two transformers, it follows that the voltage of transformer 2 is equal to the resultant voltage of transformers 1 and 3. It follows, therefore, that if two wattmeter readings were taken in which one should be the product of the current from transformer 2 by the voltage from transformer 1 and the other should be the product of the current from transformer 2 by the voltage from transformer 3 the sum of these readings would be equal to the energy supplied by transformer 2. Since the current from the transformer 2 is thus accurately measured twice—that is, once with the voltage from the transformer 1 in the upper member and once with the voltage from transformer 3 in the lower member of the instrument 8—it follows that the energy delivered by the transformer 2 as well as that delivered by transformers 1 and 3 will be properly measured in the instrument 8.

It will of course be understood that the primary windings of the series transformers may be included in either of the legs of the respective circuits.

Referring now particularly to Fig. 2 of the drawings, 25 is a three-phase generator that supplies energy to a four-wire three-phase circuit 26,27,28, and 29 either directly or through suitable transformers, as is usual in the art.

As indicated in the drawings, the conductors 26, 27, 28, and 29 supply electric lights 30; but I do not intend to thereby exclude other forms of translating devices. The wattmeter 8, employed for measuring the energy of circuits 26, 27, 28, and 29, may be of the same construction as that already described and is, in fact, shown of the same construction as that illustrated in Fig. 1. The description heretofore given of the instrument may be therefore read in connection with this figure, the reference-numerals being the same in both figures.

As in the case of energy supplied by three transformers connected in delta to three-phase circuits, it has heretofore been the practice to use three single-phase meters for measuring the output of four-wire three-phase circuits, such as are illustrated in Fig. 2. In order to utilize a single two-phase instrument or two independent single-phase instruments, and thereby simplify the apparatus and reduce the cost, I make connections as follows: The shunt-winding 12 of the upper member of the instrument is connected across circuit 26 29 and the shunt-winding 12 of the lower member of the instrument is connected across circuit 28 29. If the voltages of the circuits 26 29 and 28 29 are too high for the shunt-coils of the instrument, transformers may be employed, as indicated in Fig. 1. The series winding 11 of the upper member of the instrument has its terminals respectively connected to the terminals of the secondary winding of a series transformer 31, the primary of which is included in conductor 26. In a similar manner the terminals of the series winding of the lower member of the instrument are connected to the terminals of the secondary winding of transformer 32, the primary of which is included in conductor 28, these transformers and their connections corresponding with the transformers 17 and 18 and the connections shown in Fig. 1. The connections thus far described are such as to measure the energy of circuits 26 29 and 28 29. In order to also measure the energy of circuit 27 29, I include the primary of the series transformer 33 in conductor 27 and connect one terminal of the secondary winding to one terminal of the secondary transformer 32 and the other terminal of said winding to one terminal of the secondary winding of transformer 31. I also connect the opposite terminals of the secondaries of transformers 31 and 32 together by means of a conductor 34. With this arrangement of circuits it will be seen that the current from transformer 33, starting with the terminal connected to one terminal of the secondary of transformer 32, will pass through the series winding of the lower member of the instrument 8, and by way of the conductor 34 through the series winding of the upper member of the instrument 8, and by the connections shown back to the other terminal of the secondary of transformer 33. As in the system illustrated in Fig. 1, the voltage of each of the circuits here shown is equal to the resultant of the voltages of the other two circuits, and it will therefore appear from the description given in connection with the apparatus and circuits illustrated in Fig. 1 that the instrument 8 will accurately measure the energy of all three of the circuits 26 29, 27 29, and 28 29. It will be understood, in connection with this form of the invention, that the primary winding of each of the series transformers may be connected with either leg of the corresponding circuit.

It is of course to be understood that the wattmeters hereinbefore described are so designed and calibrated as to measure the true energy of the circuits to which they are connected and that the actual propelling forces which are applied to the movable members of the instruments are dependent upon the phase angles between the respective currents and the corresponding voltages, and consequently that any given propelling force equals the product of current multiplied by voltage and also by the cosine of the phase angle between current and corresponding voltage.

Such other modifications as may be made without materially affecting the mode of operation and result I regard as within my invention and desire to cover by my claims. The connections whereby a two-phase wattmeter or two single-phase wattmeters may be employed for measuring the energy of three circuits may be utilized in connection with any system where the voltage of any one of the three connected circuits is equal to the resultant of the other two, and my invention is intended to cover the measurement of the energy of all of such circuits.

I claim as my invention—

1. The method of measuring the energy of three interconnected, alternating-current circuits which consists in separately measuring the products of the currents and voltages of two of the circuits and at the same time measuring the product of the current of the third circuit by the voltages of the said two circuits.

2. The method of measuring the energy of three interconnected, alternating-current circuits which consists in simultaneously subjecting the movable member of an energy-measuring instrument to the independently-applied propelling force of the products of the currents and voltages of two of the circuits and the cosines of the phase angles between the respective currents and the corresponding voltages and to the propelling force of the product of the current of the third circuit by the voltages of the other two circuits and the cosines of the phase angles between said current and the respective voltages.

3. The method of measuring the energy of three interconnected, alternating-current circuits which consists in independently imparting to the movable member of an energy-measuring instrument the propelling force of the products of the currents and voltages of two of the circuits and the cosines of the phase angles between the respective currents and the corresponding voltages and that of the product of the current of the third circuit by the voltages of the other two circuits and the cosines of the phase angles between said current and the respective voltages.

In testimony whereof I have hereunto subscribed my name this 31st day of December, 1901.

FRANK CONRAD.

Witnesses:
   C. C. OWENS,
   JAMES B. YOUNG.